(12) United States Patent
Jo et al.

(10) Patent No.: US 11,655,361 B2
(45) Date of Patent: May 23, 2023

(54) THERMOPLASTIC RESIN COMPOSITION AND THERMOPLASTIC RESIN MOLDED ARTICLE

(71) Applicant: LG CHEM, LTD., Seoul (KR)

(72) Inventors: Joon Hwi Jo, Daejeon (KR); Seong Lyong Kim, Daejeon (KR); Tae Hoon Kim, Daejeon (KR); Dae Woo Lee, Daejeon (KR); Jae Bum Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/055,957

(22) PCT Filed: Feb. 10, 2020

(86) PCT No.: PCT/KR2020/001835
§ 371 (c)(1),
(2) Date: Nov. 16, 2020

(87) PCT Pub. No.: WO2020/171453
PCT Pub. Date: Aug. 27, 2020

(65) Prior Publication Data
US 2021/0221996 A1 Jul. 22, 2021

(30) Foreign Application Priority Data

Feb. 19, 2019 (KR) .................. 10-2019-0019094
Feb. 6, 2020 (KR) .................. 10-2020-0014203

(51) Int. Cl.
| | |
|---|---|
| *C08L 51/04* | (2006.01) |
| *C08L 25/12* | (2006.01) |
| *C08L 25/14* | (2006.01) |
| *C08L 33/12* | (2006.01) |
| *C08K 5/54* | (2006.01) |

(52) U.S. Cl.
CPC ............... *C08L 51/04* (2013.01); *C08K 5/54* (2013.01); *C08L 25/12* (2013.01); *C08L 25/14* (2013.01); *C08L 33/12* (2013.01); *C08L 2201/08* (2013.01); *C08L 2203/30* (2013.01); *C08L 2205/025* (2013.01); *C08L 2205/035* (2013.01)

(58) Field of Classification Search
CPC ........... C08L 2205/03; C08L 2205/035; C08L 33/12; C08L 33/10; C08L 25/14; C08L 25/12
See application file for complete search history.

(56) References Cited

U.S. PATENT DOCUMENTS

| | | | | |
|---|---|---|---|---|
| 4,224,419 A * | 9/1980 | Swoboda | ............ | C08L 51/003 525/71 |
| 4,954,546 A * | 9/1990 | Abeler | ............ | C08K 5/57 524/180 |
| 5,466,750 A | 11/1995 | Mishima et al. | | |
| 2006/0069208 A1* | 3/2006 | Dhawan | ............ | C08F 265/04 525/191 |
| 2006/0106163 A1 | 5/2006 | You | | |
| 2006/0148992 A1* | 7/2006 | Kim | ............ | C08L 23/04 525/902 |
| 2007/0129470 A1 | 6/2007 | Kuvshinnikova et al. | | |
| 2007/0129482 A1 | 6/2007 | Kuvshinnikova et al. | | |
| 2007/0191519 A1* | 8/2007 | Jiao | ............ | C09K 21/14 524/537 |
| 2008/0058460 A1* | 3/2008 | Tonge | ............ | C08L 23/04 525/100 |
| 2008/0303006 A1 | 12/2008 | Huijs et al. | | |
| 2009/0099297 A1* | 4/2009 | Huijs | ............ | C08L 25/12 525/64 |
| 2010/0069540 A1 | 3/2010 | Yoo et al. | | |
| 2015/0011709 A1* | 1/2015 | Ahn | ............ | C08F 265/04 525/230 |
| 2015/0119489 A1 | 4/2015 | Kim | | |
| 2016/0002455 A1 | 1/2016 | Chung et al. | | |
| 2017/0320982 A1* | 11/2017 | Baek | ............ | C08F 220/06 |
| 2018/0265690 A1 | 9/2018 | Kim et al. | | |
| 2020/0040115 A1 | 2/2020 | Seo et al. | | |

FOREIGN PATENT DOCUMENTS

| | | |
|---|---|---|
| CN | 103958599 A | 7/2014 |
| CN | 107501829 A | 12/2017 |
| JP | S61-236850 A | 10/1986 |
| JP | H02-045550 A | 2/1990 |
| JP | H03-285933 A | 12/1991 |
| JP | H05-262940 A | 10/1993 |
| JP | 2000-302935 A | 10/2000 |
| JP | 2001-031830 A | 2/2001 |
| JP | 2006-56961 A | 3/2006 |
| JP | 2006-241283 A | 9/2006 |
| JP | 2008-504387 A | 2/2008 |
| JP | 2010070760 A | 4/2010 |
| JP | 2016196656 A | 11/2016 |
| JP | 2018507923 A | 3/2018 |
| KR | 10-0178457 B1 | 5/1999 |
| KR | 10-2008-0082962 A | 9/2008 |
| KR | 10-2010-0018542 A | 2/2010 |
| KR | 10-2011-0056080 A | 5/2011 |
| KR | 10-2012-0009860 A | 2/2012 |
| KR | 10-2013-0057795 A | 6/2013 |
| KR | 10-2014-0005510 A | 1/2014 |
| KR | 10-2016-0072961 A | 6/2016 |
| KR | 10-2017-0057205 A | 5/2017 |
| KR | 10-2018-0068567 A | 6/2018 |
| KR | 20190013569 A | 2/2019 |
| KR | 10-1760976 B1 | 8/2020 |

* cited by examiner

OTHER PUBLICATIONS

Extended European Search Report for EP Application No. 20759477.1, dated Jul. 27, 2021.

*Primary Examiner* — Jeffrey C Mullis

(57) ABSTRACT

Provided is a thermoplastic resin composition which includes: a first copolymer including an acrylic graft copolymer; a second copolymer including an alkyl-substituted styrene-based monomer unit, a vinyl cyanide-based monomer unit, and a (meth)acrylate-based monomer unit; and a third copolymer including an alkyl-unsubstituted styrene-based monomer unit, a vinyl cyanide-based monomer unit, and a (meth)acrylate-based monomer unit. According to the present invention, a thermoplastic resin composition and a thermoplastic resin molded article, which are excellent in heat resistance, colorability, and scratch resistance, can be provided.

12 Claims, No Drawings

THERMOPLASTIC RESIN COMPOSITION AND THERMOPLASTIC RESIN MOLDED ARTICLE

CROSS-REFERENCE TO RELATED APPLICATION

This application is a National Phase of International application No. PCT/KR2020/001835, filed on Feb. 10, 2020, which claims priority to and the benefit of Korean Patent Application No. 10-2019-0019094, filed on Feb. 19, 2019, and Korean Patent Application No. 10-2020-0014203, filed on Feb. 6, 2020, the disclosures of which are incorporated herein by reference in their entirety.

TECHNICAL FIELD

The present invention relates to a thermoplastic resin composition and a thermoplastic resin molded article, and specifically, to a thermoplastic resin composition and a thermoplastic resin molded article which are excellent in heat resistance, impact resistance, colorability, and scratch resistance.

BACKGROUND ART

A diene-based thermoplastic resin composition, which includes a diene-based graft copolymer formed by graft copolymerization of a diene-based rubber polymer with an aromatic vinyl-based monomer and a vinyl cyanide-based monomer, has been used in various fields such as electricity, electronics, construction, automobiles, and the like due to having excellence in impact resistance, stiffness, chemical resistance, and processability. However, the diene-based thermoplastic resin composition is not suitable as an outdoor material due to having poor weather resistance.

For this reason, an acrylic thermoplastic resin composition, which is excellent in weather resistance and aging resistance and includes an acrylic graft copolymer formed by graft copolymerization of an acrylic rubber polymer with an aromatic vinyl-based monomer and a vinyl cyanide-based monomer, has attracted attention as an alternative. However, it is difficult to apply the acrylic thermoplastic resin composition to products that require high quality due to having poor colorability and poor scratch resistance.

Accordingly, a method of applying poly(methyl methacrylate) to the acrylic thermoplastic resin composition has been proposed to improve colorability and scratch resistance, but there is a problem of degradation of impact resistance. In order to solve the problem, a method of applying a styrene/acrylonitrile/methyl methacrylate copolymer to the acrylic thermoplastic resin composition has been proposed, but there is a problem of degradation of impact resistance and heat resistance.

DISCLOSURE

Technical Problem

The present invention is directed to providing a thermoplastic resin composition and a thermoplastic resin molded article which are excellent in weather resistance, heat resistance, impact resistance, colorability, and scratch resistance.

Technical Solution

One aspect of the present invention provides a thermoplastic resin composition which includes: a first copolymer including an acrylic graft copolymer; a second copolymer including an alkyl-substituted styrene-based monomer unit, a vinyl cyanide-based monomer unit, and a (meth)acrylate-based monomer unit; and a third copolymer including an alkyl-unsubstituted styrene-based monomer unit, a vinyl cyanide-based monomer unit, and a (meth)acrylate-based monomer unit.

Another aspect of the present invention provides a thermoplastic resin molded article formed of the above-described thermoplastic resin composition and having a heat deflection temperature of 90° C. or more, an L value of 25.5 or less, and a pencil hardness of F or more.

Advantageous Effects

A thermoplastic resin composition and a thermoplastic resin molded article according to the present invention can exhibit significantly improved weather resistance, heat resistance, impact resistance, colorability, and scratch resistance.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the average particle diameter of an acrylic rubber polymer may be measured by a dynamic light scattering method, specifically, by using a Nicomp 380 HPL instrument (manufactured by PSS Nicomp).

In the specification, an average particle diameter may refer to an arithmetic average particle diameter in the particle size distribution as measured by a dynamic light scattering method, that is, an average particle diameter measured in the scattering intensity distribution.

In the present invention, a weight-average molecular weight may be measured as a relative value with respect to a standard polystyrene (PS) sample by gel permeation chromatography using tetrahydrofuran as an eluate.

In the present invention, an alkyl-substituted styrene-based monomer unit may be a unit derived from an alkyl-substituted styrene-based monomer. For example, the alkyl-substituted styrene-based monomer may be one or more selected from the group consisting of α-methyl styrene, p-methyl styrene, and 2,4-dimethyl styrene, with α-methyl styrene being preferred.

In the present invention, an alkyl-unsubstituted styrene-based monomer unit may be a unit derived from an alkyl-unsubstituted styrene-based monomer. For example, the alkyl-unsubstituted styrene-based monomer may be one or more selected from the group consisting of styrene, p-bromostyrene, o-bromostyrene, and p-chlorostyrene, with styrene being preferred.

In the present invention, a vinyl cyanide-based monomer unit may be a unit derived from a vinyl cyanide-based monomer. For example, the vinyl cyanide-based monomer may be one or more selected from the group consisting of acrylonitrile, methacrylonitrile, ethacrylonitrile, and 2-chloroacrylonitrile, with acrylonitrile being preferred.

In the present invention, a (meth)acrylate-based monomer unit may be one or more selected from the group consisting of units derived from an acrylate-based monomer and a methacrylate-based monomer. The (meth)acrylate-based monomer may be one or more selected from the group consisting of a $C_1$ to $C_{10}$ alkyl acrylate-based monomer unit and a $C_1$ to $C_{10}$ alkyl methacrylate-based monomer unit. For example, the (meth)acrylate-based monomer may be one or more selected from the group consisting of methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, isononyl (meth)acrylate, and decyl (meth)acrylate, with one or more selected from the group consisting of methyl methacrylate and butyl acrylate being preferred.

In the present invention, a vinyl-based monomer may refer to one or more selected from the group consisting of an aromatic vinyl-based monomer and a vinyl cyanide-based monomer. Here, the aromatic vinyl-based monomer may refer to one or more selected from the group consisting of an alkyl-substituted styrene-based monomer and an alkyl-unsubstituted styrene-based monomer.

1. Thermoplastic Resin Composition

A thermoplastic resin composition according to an embodiment of the present invention includes: 1) a first copolymer including an acrylic graft copolymer; 2) a second copolymer including an alkyl-substituted styrene-based monomer unit, a vinyl cyanide-based monomer unit, and a (meth)acrylate-based monomer unit; and 3) a third copolymer including an alkyl-unsubstituted styrene-based monomer unit, a vinyl cyanide-based monomer unit, and a (meth)acrylate-based monomer unit.

The thermoplastic resin composition according to an embodiment of the present invention may further include 4) a (meth)acrylate-based polymer.

In addition, the thermoplastic resin composition according to an embodiment of the present invention may further include 5) an additive including a silicone compound.

Hereinafter, each component of the thermoplastic resin composition according to an embodiment of the present invention will be described in detail.

1) First Copolymer

The first copolymer may impart excellent weather resistance, impact resistance, elongation, colorability, chemical resistance, processability, surface gloss characteristics, and whitening characteristics to the thermoplastic resin composition.

The first copolymer includes an acrylic graft copolymer, and the acrylic graft copolymer may be formed by graft copolymerization of an acrylic rubber polymer with a vinyl-based monomer and is preferably formed by graft copolymerization of an acrylic rubber polymer with an aromatic vinyl-based monomer and a vinyl cyan-based monomer.

The acrylic rubber polymer may have an average particle diameter of 30 to 650 nm or 50 to 550 nm, with the range of 50 to 550 nm being preferred. When the above-described range is satisfied, the weather resistance, impact resistance, elongation, colorability, chemical resistance, processability, surface gloss characteristics, and whitening characteristics of the thermoplastic resin composition can be improved.

Meanwhile, the first copolymer may include a first acrylic graft copolymer and a second acrylic graft copolymer which are formed of acrylic rubber polymers having mutually different average particle diameters to improve weather resistance, impact resistance, elongation, colorability, chemical resistance, processability, surface gloss characteristics, and whitening characteristics.

The first acrylic graft copolymer may be formed by graft copolymerization of an acrylic rubber polymer having an average particle diameter of 300 to 650 nm or 350 to 550 nm with a vinyl-based monomer and is preferably formed by graft copolymerization of an acrylic rubber polymer having an average particle diameter of 350 to 550 nm with a vinyl-based monomer. When the above-described condition is satisfied, impact resistance can be improved.

The second acrylic graft copolymer may be formed by graft copolymerization of an acrylic rubber polymer having an average particle diameter of 30 to 250 nm or 50 to 150 nm with a vinyl-based monomer and is preferably formed by graft copolymerization of an acrylic rubber polymer having an average particle diameter of 50 to 150 nm with a vinyl-based monomer. When the above-described condition is satisfied, weather resistance, colorability, chemical resistance, appearance quality, elongation, and whitening characteristics can be improved. Specifically, since a specific surface area is increased as the acrylic rubber polymer has a smaller average particle diameter, weather resistance may be improved. In addition, since it is possible to pass visible light through the acrylic rubber polymer, colorability may be improved. Additionally, since it is possible to uniformly distribute a relatively high content of the second acrylic graft copolymer in the thermoplastic resin composition, elongation and whitening characteristics may be improved.

Here, the acrylic rubber polymer may be formed by a crosslinking reaction of a (meth)acrylate-based monomer, preferably a $C_4$ to $C_{10}$ alkyl (meth)acrylate-based monomer, and more preferably butyl acrylate.

The first acrylic graft copolymer and the second acrylic graft copolymer may be included in a weight ratio of 5:95 to 25:75 or 10:90 to 20:80, with the range of 10:90 to 20:80 being preferred. When the above-described condition is satisfied, a thermoplastic resin composition which achieves the balance among impact resistance, weather resistance, colorability, chemical resistance, appearance quality, elongation, and whitening characteristics can be prepared.

The first copolymer may be directly prepared, or a commercially available product may be used as the first copolymer.

The first copolymer may be included in an amount of 20 to 50 parts by weight, 25 to 45 parts by weight, or 32 to 42 parts by weight with respect to 100 parts by weight of the sum of the first copolymer, the second copolymer, and the third copolymer and is preferably included in an amount of 32 to 42 parts by weight. When the above-described condition is satisfied, the elongation, weather resistance, chemical resistance, colorability, processability, surface gloss characteristics, and whitening characteristics of the thermoplastic resin composition can be remarkably improved.

2) Second Copolymer

The second copolymer may impart excellent heat resistance and weather resistance to the thermoplastic resin composition. In addition, the second copolymer may work synergistically with a third copolymer to be described below to impart excellent heat resistance, weather resistance, scratch resistance, and colorability to the thermoplastic resin composition.

The second copolymer, which is a non-grafted copolymer, includes an alkyl-substituted styrene-based monomer unit, a vinyl cyanide-based monomer unit, and a (meth)acrylate-based monomer unit. The second copolymer may impart excellent heat resistance, weather resistance, and scratch resistance to the thermoplastic resin composition by including the alkyl-substituted styrene-based monomer unit. In addition, the second copolymer may impart excellent chemical resistance and stiffness to the thermoplastic resin composition by including the vinyl cyanide-based monomer unit. Additionally, the second copolymer may impart excellent colorability to the thermoplastic resin composition by including the (meth)acrylate-based monomer unit.

The second copolymer may be a copolymer of a monomer mixture including an alkyl-substituted styrene-based monomer, a vinyl cyanide-based monomer, and a (meth)acrylate-based monomer.

The monomer mixture may include the alkyl-substituted styrene-based monomer at 30 to 50 wt % or 35 to 45 wt %, with the range of 35 to 45 wt % being preferred. When the above-described condition is satisfied, the heat resistance, weather resistance, and scratch resistance of the thermoplastic resin composition can be improved.

The monomer mixture may include the vinyl cyanide-based monomer at 20 to 40 wt % or 25 to 35 wt %, with the range of 25 to 35 wt % being preferred. When the above-described condition is satisfied, the chemical resistance and stiffness of the thermoplastic resin composition can be improved.

The monomer mixture may include the (meth)acrylate-based monomer at 20 to 40 wt % or 25 to 35 wt %, with the range of 25 to 35 wt % being preferred. When the above-described condition is satisfied, the colorability of the thermoplastic resin composition can be improved without degrading impact resistance.

Here, the (meth)acrylate-based monomer is preferably a $C_1$ to $C_3$ alkyl (meth)acrylate-based monomer.

The second copolymer may have a weight-average molecular weight of 80,000 to 110,000 g/mol, 85,000 to 105,000 g/mol, or 80,000 to 100,000 g/mol, with the range of 80,000 to 100,000 g/mol being preferred. When the above-described condition is satisfied, the fluidity and mechanical properties of the thermoplastic resin composition can be appropriately maintained.

The second copolymer may be an α-methyl styrene/acrylonitrile/methyl methacrylate copolymer.

The second copolymer may be a commercially available product or prepared by suspension polymerization or bulk polymerization of the monomer mixture and is preferably prepared by bulk polymerization so that a high-purity copolymer is prepared.

The second copolymer may be included in an amount of 20 to 45 parts by weight, 25 to 40 parts by weight, or 32 to 38 parts by weight with respect to 100 parts by weight of the sum of the first copolymer, the second copolymer, and the third copolymer and is preferably included in an amount of 30 to 40 parts by weight. When the above-described condition is satisfied, the heat resistance, scratch resistance, and colorability of the thermoplastic resin composition can be improved. In addition, the heat resistance, scratch resistance, and colorability of the thermoplastic resin composition can be balanced.

3) Third Copolymer

The third copolymer may impart excellent colorability and processability to the thermoplastic resin composition. In addition, the third copolymer may work synergistically with the above-described second copolymer to impart excellent scratch resistance to the thermoplastic resin composition.

The third copolymer, which is a non-grafted copolymer, includes an alkyl-unsubstituted styrene-based monomer unit, a vinyl cyanide-based monomer unit, and a (meth)acrylate-based monomer unit. The third copolymer may impart excellent colorability and processability to the thermoplastic resin composition by including the alkyl-unsubstituted styrene-based monomer unit. In addition, the third copolymer may impart excellent chemical resistance and stiffness to the thermoplastic resin composition by including the vinyl cyanide-based monomer unit. Additionally, the third copolymer may impart excellent scratch resistance to the thermoplastic resin composition by working synergistically with the above-described second copolymer.

The third copolymer may include the alkyl-unsubstituted styrene-based monomer unit at 10 to 35 wt % or 15 to 30 wt %, with the range of 15 to 30 wt % being preferred. When the above-described condition is satisfied, superior processability can be imparted to the thermoplastic resin composition.

The third copolymer may include the vinyl cyanide-based monomer unit at 3 to 15 wt % or 5 to 10 wt %, with the range of 5 to 10 wt % being preferred. When the above-described condition is satisfied, superior chemical resistance and stiffness can be imparted to the thermoplastic resin composition.

The third copolymer may include the (meth)acrylate-based monomer unit at 60 to 80 wt % or 65 to 75 wt %, with the range of 65 to 75 wt % being preferred. When the above-described condition is satisfied, the colorability of the thermoplastic resin composition can be improved without degrading impact resistance.

Here, the (meth)acrylate-based monomer unit is preferably a unit derived from a $C_1$ to $C_3$ alkyl (meth)acrylate-based monomer.

The third copolymer may be a methyl methacrylate/styrene/acrylonitrile copolymer.

The third copolymer may be directly prepared, or a commercially available product may be used as the third copolymer.

The third copolymer may be included in an amount of 10 to 40 parts by weight, 15 to 35 parts by weight, or 20 to 30 parts by weight with respect to 100 parts by weight of the sum of the first copolymer, the second copolymer, and the third copolymer and is preferably included in an amount of 20 to 30 parts by weight. When the above-described range is satisfied, the impact resistance and processability of the thermoplastic resin composition can be improved.

4) (Meth)Acrylate-Based Polymer

The (meth)acrylate-based polymer may impart excellent processability, colorability, scratch resistance, and weather resistance to the thermoplastic resin composition.

The (meth)acrylate-based polymer, which is a non-grafted copolymer, may include a (meth)acrylate-based monomer unit and preferably includes a $C_1$ to $C_3$ alkyl (meth)acrylate-based monomer unit.

The (meth)acrylate-based polymer may have a weight-average molecular weight of 15,000 to 150,000 g/mol, 20,000 to 120,000 g/mol, or 24,000 to 98,000 g/mol, with the range of 24,000 to 98,000 g/mol being preferred. When the above-described condition is satisfied, the colorability and processability of the thermoplastic resin composition can be improved. In addition, as the (meth)acrylate-based polymer has a lower weight-average molecular weight, the processability of the thermoplastic resin composition can be improved.

The (meth)acrylate-based polymer may be poly(methyl methacrylate).

The (meth)acrylate-based polymer may be directly prepared, or a commercially available product may be used as the (meth)acrylate-based polymer.

The (meth)acrylate-based polymer may be included in an amount of 1 to 20 parts by weight, 3 to 17 parts by weight, or 5 to 15 parts by weight with respect to 100 parts by weight of the sum of the first copolymer, the second copolymer, the third copolymer, and the (meth)acrylate-based polymer and is preferably included in an amount of 5 to 15 parts by weight. When the above-described condition is satisfied, the colorability, scratch resistance, and processability of the thermoplastic resin composition can be improved.

5) Additive

The additive may include a silicone compound.

The silicone compound may impart excellent scratch resistance and abrasion resistance to the thermoplastic resin composition. In addition, the silicone compound may enhance releasability so that an injection-molded article formed of the thermoplastic resin composition is easily separated from a metal mold. Additionally, the silicone compound may enhance injection moldability by acting as a good lubricant in the thermoplastic resin composition. In addition, since the thermoplastic resin composition has an improved melt flow index when melted, processability may be enhanced. Additionally, the silicone compound may reduce the surface friction of a molded article formed of the thermoplastic resin composition and improve the surface glossiness thereof. In addition, the silicone compound may be uniformly mixed in the thermoplastic resin composition due to having high compatibility with the first copolymer, the second copolymer, the third copolymer, and the (meth)acrylate-based polymer which are the components of the thermoplastic resin composition.

The silicone compound is a slip agent and may be polyester-modified siloxane.

The silicone compound may be directly prepared, or a commercially available product may be used as the silicone compound. Among the commercially available products, TEGOMER H-Si 6440P or TEGOMER H-Si 6441P manufactured by Evonik Nutrition & Care GmbH may be used.

The additive may be included in an amount of 0.1 to 3 parts by weight or 0.5 to 2 parts by weight with respect to 100 parts by weight of the sum of the first copolymer, the second copolymer, and the third copolymer or with respect to 100 parts by weight of the sum of the first copolymer, the second copolymer, the third copolymer, and the (meth) acrylate-based polymer and is preferably included in an amount of 0.5 to 2 parts by weight. When the above-described condition is satisfied, the additive can exhibit high compatibility with the components of the thermoplastic resin composition, the scratch resistance, abrasion resistance, moldability, and surface glossiness of the thermoplastic resin composition can be improved, and the surface friction of the thermoplastic resin composition can be reduced.

2. Thermoplastic Resin Molded Article

A thermoplastic resin molded article according to another embodiment of the present invention is formed of the thermoplastic resin composition according to an embodiment of the present invention and has a heat deflection temperature of 90° C. or more, an L value of 25.5 or less, and a pencil hardness of F or more. The thermoplastic resin molded article preferably has a heat deflection temperature of 90 to 105° C., an L value of 24 to 25.5, and a pencil hardness of F or more and more preferably has a heat deflection temperature of 91 to 105° C., an L value of 24 to 25.2, and a pencil hardness of H or more. Since the thermoplastic resin molded article satisfies the above-described conditions, excellent heat resistance, color characteristics, and scratch resistance can be realized.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

Preparation Example 1

95 parts by weight of a monomer mixture including α-methyl styrene at 40 wt %, acrylonitrile at 30 wt %, and methyl methacrylate at 30 wt % was mixed with 5 parts by weight of toluene as a reaction solvent and 0.075 parts by weight of 1,1-bis(t-butylperoxy)cyclohexane and 0.195 parts by weight of polyether poly-t-butylperoxycarbonate as initiators to prepare a polymerization solution. Polymerization was performed by continuously adding the polymerization solution to a reactor set at 110° C. The polymerization product thus produced was transferred to a devolatilization tank, and unreacted monomers and the reaction solvent were recovered and removed at a temperature of 235° C. and a pressure of 20.6 Torr, thereby preparing an α-methyl styrene/acrylonitrile/methyl methacrylate copolymer (weight-average molecular weight: 95,000 g/mol) which is a copolymer in pellet form.

Examples and Comparative Examples

The specifications of components used in Examples and Comparative Examples are as follows.

(A) Acrylic Graft Copolymer (A-1) First acrylic graft copolymer: SA927 commercially available from LG Chem Ltd. (graft copolymer formed by graft polymerization of a butyl acrylate rubber polymer having an average particle diameter of 450 nm with styrene and acrylonitrile) was used.

(A-2) Second acrylic graft copolymer: SA100 commercially available from LG Chem Ltd. (graft copolymer formed by graft polymerization of a butyl acrylate rubber polymer having an average particle diameter of 100 nm with styrene and acrylonitrile) was used.

(B) Alkyl-Substituted Styrene-Based Copolymer (B-1): The copolymer prepared in Preparation Example 1 was used.

(B-2): 200UH commercially available from LG Chem Ltd. (α-methyl styrene/acrylonitrile copolymer) was used.

(C) Alkyl-unsubstituted styrene-based copolymer: XT510 commercially available from LG Chem Ltd. (styrene/acrylonitrile/methyl methacrylate copolymer) was used.

(D) (Meth)Acrylate-Based Polymer (D-1): IH830 commercially available from LG MMA Corp. (poly(methyl methacrylate), weight-average molecular weight: 98,000 g/mol) was used.

(D-2): BA611 commercially available from LG MMA Corp. (poly(methyl methacrylate), weight-average molecular weight: 45,000 g/mol) was used.

(D-3): BN600 commercially available from LG MMA Corp. (poly(methyl methacrylate), weight-average molecular weight: 24,000 g/mol) was used.

(E) Silicone compound: TEGOMER 6441P commercially available from Evonik Industries was used.

The above-described components were mixed in contents shown in Table 1 to Table 3 and stirred to prepare thermoplastic resin compositions.

Experimental Example 1

Each of the thermoplastic resin compositions of Examples and Comparative Examples was introduced into an extruder kneader (cylinder temperature: 240° C.) and then extruded to prepare pellets. Physical properties of the pellets were evaluated by methods described below, and results thereof are shown in Table 1 to Table 3.

(1) Melt flow index (g/10 min): measured by weighing the pellet under conditions of 220° C. and a 10 kg load for 10 minutes using MI-4 commercially available from GOETT-FERT in accordance with ASTM D1238.

(2) Heat deflection temperature (° C.): measured using an auto HDT tester 6A-2 (manufactured by TOYO SEIKI SEISAKY-SHO Ltd.) in accordance with ASTM D648.

Experimental Example 2

Each of the pellets prepared in Experimental Example 1 was injection-molded to prepare a specimen. Physical properties of the specimen were evaluated by methods described below, and results thereof are shown in Table 1 to Table 3.

(1) IZOD impact strength (kg·cm/cm, Notched, ¼ In): measured at 23° C. using an impact tester manufactured by TOYO SEIKI SEISAKY-SHO Ltd. in accordance with ASTM D256.

(2) Colorability: determined by measuring the L value in a SCI mode using Color-Eye 7000A commercially available from GretagMacbeth.

(3) Pencil hardness: Scratch resistance was measured by visually examining whether the surface of the specimen was scratched while applying a scratch on the surface with a pencil maintained under a 0.5 kg load at an angle of 45° while varying the pencil hardness.

TABLE 1

| Classification | | Comparative Example 1 | Example 1 | Comparative Example 2 | Example 2 | Example 3 |
|---|---|---|---|---|---|---|
| (A) Acrylic graft copolymer (parts by weight) | (A-1) | 5 | 5 | 5 | 5 | 5 |
| | (A-2) | 30 | 30 | 30 | 30 | 30 |
| (B) Alkyl-substituted styrene-based copolymer (parts by weight) | (B-1) | — | 35 | — | 35 | 40 |
| | (B-2) | 35 | — | 35 | — | — |
| (C) Alkyl-unsubstituted styrene-based copolymer (parts by weight) | | 30 | 30 | 30 | 30 | 25 |
| (D) (Meth)acrylate-based polymer (parts by weight) | (D-1) | — | — | — | — | — |
| | (D-2) | — | — | — | — | — |
| | (D-3) | — | — | — | — | — |
| (E) Silicone compound (parts by weight) | | — | — | 1 | 1 | 1 |
| Melt flow index | | 8 | 8 | 8 | 8 | 8 |
| Heat deflection temperature | | 91 | 90 | 90 | 90 | 93 |
| IZOD impact strength | | 9 | 9 | 9 | 9 | 9 |
| Colorability | | 25.9 | 25.4 | 25.9 | 25.4 | 25.5 |
| Pencil hardness | | HB | F | F | H | H |

TABLE 2

| Classification | | Comparative Example 3 | Example 4 | Example 5 | Example 6 |
|---|---|---|---|---|---|
| (A) Acrylic graft copolymer (parts by weight) | (A-1) | 5 | 5 | 5 | 5 |
| | (A-2) | 30 | 30 | 30 | 30 |
| (B) Alkyl-substituted styrene-based copolymer (parts by weight) | (B-1) | — | 35 | 35 | 35 |
| | (B-2) | 35 | — | — | — |
| (C) Alkyl-unsubstituted styrene-based copolymer (parts by weight) | | 20 | 20 | 20 | 20 |
| (D) (Meth)acrylate-based polymer (parts by weight) | (D-1) | 10 | 10 | — | — |
| | (D-2) | — | — | 10 | — |
| | (D-3) | — | — | — | 10 |
| (E) Silicone compound (parts by weight) | | 1 | 1 | 1 | 1 |
| Melt flow index | | 8 | 8 | 12 | 14 |
| Heat deflection temperature | | 91 | 91 | 91 | 90 |
| IZOD impact strength | | 9 | 9 | 9 | 9 |

(A) Acrylic graft copolymer
(A-1) First acrylic graft copolymer: SA927 commercially available from LG Chem Ltd. (graft copolymer formed by graft polymerization of a butyl acrylate rubber polymer having an average particle diameter of 450 nm with styrene and acrylonitrile)
(A-2) Second acrylic graft copolymer: SA100 commercially available from LG Chem Ltd. (graft copolymer formed by graft polymerization of a butyl acrylate rubber polymer having an average particle diameter of 100 nm with styrene and acrylonitrile)
(B) Alkyl-substituted styrene-based copolymer
(B-1): Copolymer prepared in Preparation Example 1 (α-methyl styrene/acrylonitrile/methyl methacrylate copolymer)
(B-2): 200UH commercially available from LG Chem Ltd. (α-methyl styrene/acrylonitrile copolymer)
(C) Alkyl-unsubstituted styrene-based copolymer: XT510 commercially available from LG Chem Ltd. (styrene/acrylonitrile/methyl methacrylate copolymer)
(D) (Meth)acrylate-based polymer
(D-1): IH830 commercially available from LG MMA Corp. (poly(methyl methacrylate), weight-average molecular weight: 98,000 g/mol)
(D-2): BA611 commercially available from LG MMA Corp. (poly(methyl methacrylate), weight-average molecular weight: 45,000 g/mol)
(D-3): BN600 commercially available from LG MMA Corp. (poly(methyl methacrylate), weight-average molecular weight: 24,000 g/mol)
(E) Silicone compound: TEGOMER 6441P commercially available from Evonik Industries TABLE 2-continued

| Classification | Comparative Example 3 | Example 4 | Example 5 | Example 6 |
|---|---|---|---|---|
| Colorability | 25.7 | 25.2 | 25.2 | 25.2 |
| Pencil hardness | F | H | H | H |

(A) Acrylic graft copolymer
(A-1) First acrylic graft copolymer: SA927 commercially available from LG Chem Ltd. (graft copolymer formed by graft polymerization of a butyl acrylate rubber polymer having an average particle diameter of 450 nm with styrene and acrylonitrile)
(A-2) Second acrylic graft copolymer: SA100 commercially available from LG Chem Ltd. (graft copolymer formed by graft polymerization of a butyl acrylate rubber polymer having an average particle diameter of 100 nm with styrene and acrylonitrile)
(B) Alkyl-substituted styrene-based copolymer
(B-1): Copolymer prepared in Preparation Example 1 (α-methyl styrene/acrylonitrile/methyl methacrylate copolymer)
(B-2): 200UH commercially available from LG Chem Ltd. (α-methyl styrene/acrylonitrile copolymer)
(C) Alkyl-unsubstituted styrene-based copolymer: XT510 commercially available from LG Chem Ltd. (styrene/acrylonitrile/methyl methacrylate copolymer)
(D) (Meth)acrylate-based polymer
(D-1): IH830 commercially available from LG MMA Corp. (poly(methyl methacrylate), weight-average molecular weight: 98,000 g/mol)
(D-2): BA611 commercially available from LG MMA Corp. (poly(methyl methacrylate), weight-average molecular weight: 45,000 g/mol)
(D-3): BN600 commercially available from LG MMA Corp. (poly(methyl methacrylate), weight-average molecular weight: 24,000 g/mol)
(E) Silicone compound: TEGOMER 6441P commercially available from Evonik Industries

TABLE 3

| Classification | | Comparative Examples | | |
|---|---|---|---|---|
| | | 4 | 5 | 6 |
| (A) Acrylic graft copolymer (parts by weight) | (A-1) | 5 | 5 | 5 |
| | (A-2) | 30 | 30 | 30 |
| (B) Alkyl-substituted styrene-based copolymer (parts by weight) | (B-1) | — | — | 65 |
| | (B-2) | — | — | — |
| (C) Alkyl-unsubstituted styrene-based copolymer (parts by weight) | | 65 | — | — |
| (D) (Meth)acrylate-based polymer (parts by weight) | (D-1) | — | 65 | — |
| | (D-2) | — | — | — |
| | (D-3) | — | — | — |
| (E) Silicone compound (parts by weight) | | 1 | 1 | 1 |
| Melt flow index | | 8 | 4 | 7 |
| Heat deflection temperature | | 83 | 87 | 96 |
| IZOD impact strength | | 7 | 6 | 9 |
| Colorability | | 25.1 | 24.8 | 25.7 |
| Pencil hardness | | F | H | F |

(A) Acrylic graft copolymer
(A-1) First acrylic graft copolymer: SA927 commercially available from LG Chem Ltd. (graft copolymer formed by graft polymerization of a butyl acrylate rubber polymer having an average particle diameter of 450 nm with styrene and acrylonitrile)
(A-2) Second acrylic graft copolymer: SA100 commercially available from LG Chem Ltd. (graft copolymer formed by graft polymerization of a butyl acrylate rubber polymer having an average particle diameter of 100 nm with styrene and acrylonitrile)
(B) Alkyl-substituted styrene-based copolymer
(B-1): Copolymer prepared in Preparation Example 1 (α-methyl styrene/acrylonitrile/methyl methacrylate copolymer)
(B-2): 200UH commercially available from LG Chem Ltd. (α-methyl styrene/acrylonitrile copolymer)
(C) Alkyl-unsubstituted styrene-based copolymer: XT510 commercially available from LG Chem Ltd. (styrene/acrylonitrile/methyl methacrylate copolymer)
(D) (Meth)acrylate-based polymer
(D-1): IH830 commercially available from LG MMA Corp. (poly(methyl methacrylate), weight-average molecular weight: 98,000 g/mol)
(D-2): BA611 commercially available from LG MMA Corp. (poly(methyl methacrylate), weight-average molecular weight: 45,000 g/mol)
(D-3): BN600 commercially available from LG MMA Corp. (poly(methyl methacrylate), weight-average molecular weight: 24,000 g/mol)
(E) Silicone compound: TEGOMER 6441P commercially available from Evonik Industries Referring to Table 1, the thermoplastic resin composition of Example 1, which included an α-methyl styrene/acrylonitrile/methyl methacrylate copolymer, was excellent in colorability and scratch resistance compared to the thermoplastic resin composition of Comparative Example 1 which included a styrene/acrylonitrile/methacrylate copolymer. In addition, the thermoplastic resin composition of Example 2, which included an α-methyl styrene/acrylonitrile/methyl methacrylate copolymer and a silicone compound, was excellent in colorability and scratch resistance compared to the thermoplastic resin composition of Comparative Example 2 which included a styrene/acrylonitrile/methacrylate copolymer and a silicone compound.

As a result of comparing Example 1 and Example 2, the thermoplastic resin composition of Example 2, which further included a silicone compound, exhibited excellent scratch resistance compared to the thermoplastic resin composition of Example 1.

As a result of comparing Example 2 and Example 3, the thermoplastic resin composition of Example 3, which included an excessive amount of an α-methyl styrene/acrylonitrile/methyl methacrylate copolymer, was excellent in heat resistance but exhibited slightly degraded colorability compared to the thermoplastic resin composition of Example 2.

Referring to Table 2, even when poly(methyl methacrylate) was further included, the thermoplastic resin compositions of Examples 4 to 6, which included an α-methyl styrene/acrylonitrile/methyl methacrylate copolymer, were excellent in colorability and scratch resistance compared to the thermoplastic resin composition of Comparative Example 3 which included a styrene/acrylonitrile/methacrylate copolymer.

As a result of comparing Examples 2 and 4 to 6, even though poly(methyl methacrylate) did not greatly affect the physical properties of the thermoplastic resin composition, when poly(methyl methacrylate) having a low weight-average molecular weight was used, a melt flow index was increased, and thus processability was improved.

Referring to Table 3, in the case of the thermoplastic resin composition of Comparative Example 4 which did not include an α-methyl styrene/acrylonitrile/methyl methacrylate copolymer, a heat deflection temperature and impact strength were significantly degraded. In addition, in the case of the thermoplastic resin composition of Comparative Example 5 which did not include an α-methyl styrene/acrylonitrile/methyl methacrylate copolymer and a styrene/acrylonitrile copolymer, a melt flow index, a heat deflection temperature, and impact strength were significantly degraded. Additionally, in the case of the thermoplastic resin composition of Comparative Example 6 which did not include a styrene/acrylonitrile copolymer, colorability was significantly degraded.

The invention claimed is:
1. A thermoplastic resin composition comprising:
   a first copolymer including an acrylic graft copolymer;
   a second copolymer including an alkyl-substituted styrene-based monomer unit, a vinyl cyanide-based monomer unit, and a methacrylate-based monomer unit; and
   a third copolymer including an alkyl-unsubstituted styrene-based monomer unit, a vinyl cyanide-based monomer unit, and a (meth)acrylate-based monomer unit,
   wherein the thermoplastic resin composition includes, with respect to 100 parts by weight of the sum of the first copolymer, the second copolymer, and the third copolymer:
   20 to 50 parts by weight of the first copolymer;
   20 to 45 parts by weight of the second copolymer; and
   15 to 40 parts by weight of the third copolymer.
2. The thermoplastic resin composition of claim 1, wherein the first copolymer includes:

a first acrylic graft copolymer formed by graft copolymerization of an acrylic rubber polymer having an average particle diameter of 300 to 650 nm with a vinyl-based monomer; and a second acrylic graft copolymer formed by graft copolymerization of an acrylic rubber polymer having an average particle diameter of 30 to 250 nm with a vinyl-based monomer.

3. The thermoplastic resin composition of claim 2, wherein the first copolymer includes the first acrylic graft copolymer and the second acrylic graft copolymer in a weight ratio of 5:95 to 25:75.

4. The thermoplastic resin composition of claim 1, wherein the second copolymer is a copolymer of a monomer mixture including an alkyl-substituted styrene-based monomer at 30 to 50 wt %, a vinyl cyanide-based monomer at 20 to 40 wt %, and a (meth)acrylate-based monomer at 20 to 40 wt %.

5. The thermoplastic resin composition of claim 1, further comprising a (meth)acrylate-based polymer.

6. The thermoplastic resin composition of claim 5, wherein the (meth)acrylate-based polymer is poly(methyl methacrylate).

7. The thermoplastic resin composition of claim 5, wherein the thermoplastic resin composition includes the (meth)acrylate-based polymer in an amount of 1 to 20 parts by weight with respect to 100 parts by weight of the sum of the first copolymer, the second copolymer, the third copolymer, and the (meth)acrylate-based polymer.

8. The thermoplastic resin composition of claim 1, further comprising an additive including a silicone compound.

9. The thermoplastic resin composition of claim 8, wherein the thermoplastic resin composition includes the additive in an amount of 0.1 to 3 parts by weight with respect to 100 parts by weight of the sum of the first copolymer, the second copolymer, and the third copolymer.

10. A thermoplastic resin molded article made of the thermoplastic resin composition of claim 1 and having a heat deflection temperature of 90° C. or more, an L value of 25.5 or less, and a pencil hardness of F or more.

11. The thermoplastic resin composition of claim 1, wherein the (meth)acrylate-based monomer unit of the third copolymer is a methacrylate-based monomer unit.

12. The thermoplastic resin composition of claim 1, wherein the thermoplastic resin composition further includes poly(methyl methacrylate) in an amount of 1 to less than 15 parts by weight with respect to 100 parts by weight of the sum of the first copolymer, the second copolymer, the third copolymer, and the (poly(methyl methacrylate).

* * * * *